United States Patent [19]

Reitz

[11] 4,202,548
[45] May 13, 1980

[54] INTERNATIONAL CODE FLAG EDUCATIONAL GAME

[76] Inventor: M. Robert Reitz, P.O. Box 1543, Annapolis, Md. 21404

[21] Appl. No.: 920,982

[22] Filed: Jun. 30, 1978

[51] Int. Cl.² ............................................. A63F 3/00
[52] U.S. Cl. ...................................... 273/272; 35/14; 273/299
[58] Field of Search ........................... 35/14, 35 H, 71; 273/272, 296, 299, 302

[56] References Cited

U.S. PATENT DOCUMENTS

| 1,264,508 | 4/1918 | Heartt | 273/296 |
| 3,655,195 | 4/1972 | Bean | 273/272 |
| 3,877,703 | 4/1975 | Pierre | 273/272 X |

FOREIGN PATENT DOCUMENTS 554900 7/1943 United Kingdom ........................ 35/14

OTHER PUBLICATIONS

"International Code Flags" Sheet, under "Flags" section of Encyclopedia Americana.
"Scrabble Brand" Crossword Game, p. 5 of 1977 Selchow & Righter Games Catalog.

Primary Examiner—Harland S. Skogquist
Attorney, Agent, or Firm—Schwartz, Jeffery, Schwaab, Mack, Blumenthal & Koch

[57] ABSTRACT

One embodiment of the invention includes a 15 by 15 matrix having International Code Flags representative of various numbers which create multiple values. In addition, there are International Code Flag tiles with letter symbols on one side thereof for use in creating words. On the reverse side of the tiles is the equivalent Roman letter. The tiles are laid out on the board in such a manner as to create a word. The value of the word is determined by the number of colors in the flag on the tile, as well as by multiple values on the board.

3 Claims, 4 Drawing Figures

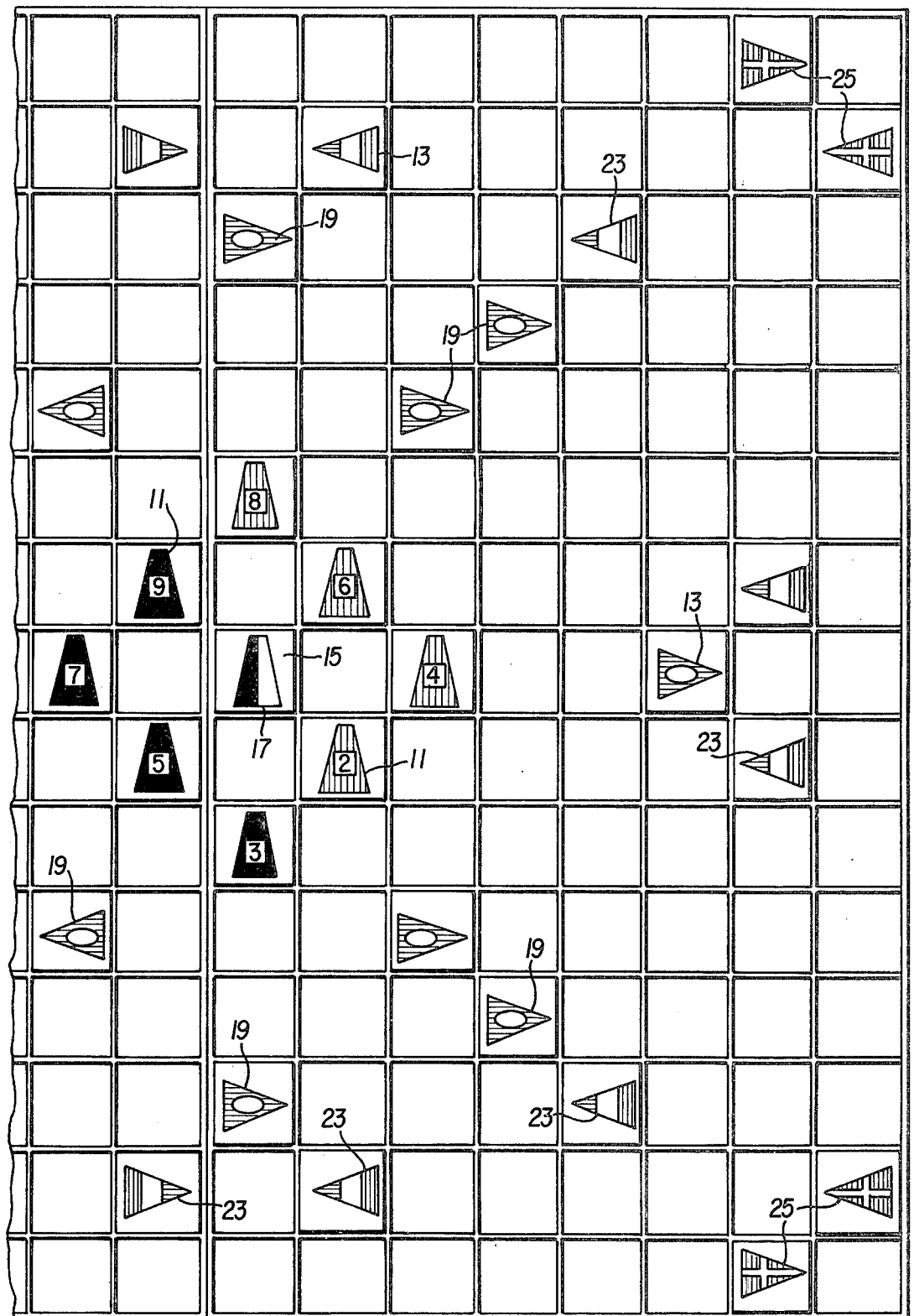
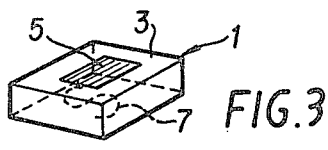
FIG.1B
FIG.3

INTERNATIONAL CODE FLAG EDUCATIONAL GAME

BACKGROUND OF THE INVENTION

The instant invention relates to an educational game apparatus adapted to teach International Code Flags symbols. More particularly, the invention relates to a game utilizing tiles having a flat surface with the international code symbols on one side and it can include the corresponding Roman letters on the reverse side.

The prior art illustrates various types of game devices for teaching, for example, the Morse Code or semaphore signals. U.S. Pat. Nos. 1,342,520 and 1,528,108 illustrate card games for this purpose; whereas, U.S. Pat. No. 3,233,343 illustrates cubes for teaching the Morse Code.

The prior art further includes U.S. Pat. Nos. 2,752,158; 3,877,703 and 3,655,195 which illustrate word games utilizing tiles and a game board, while U.S. Pat. No. 3,904,207 is a similar approach for teaching mathematics. Finally, U.S. Pat. No. 3,858,333 is illustrative of an educational game which is utilized to teach sign language.

In learning the International Code Flags it is normally necessary to use systems such as "flash cards" and/or mere rote memorizing. The purpose of the instant invention is to enable seamen, midshipmen, yachtsmen and others to learn the International Code Flags in a more pleasant manner and in such a way as to form words as they learn. The learning routine is made more enjoyable if it is in the form of a game. It will be appreciated that the game will also be instructive not only to players, but also to those who watch the players. By creating a game which is also competitive, it is possible to keep the interest of the participants for a greater length of time.

SUMMARY OF THE INVENTION

One embodiment of the invention includes a 15 by 15 matrix having International Code Flags representative of various numbers which create multiple values. In addition, there are International Code Flag tiles with letter symbols on one side thereof for use in creating words. On the reverse side of the tiles is the equivalent Roman letter. The tiles are laid out on the board in such a manner as to create a word. The value of the word is determined by the number of colors in the flag on the tile, as well as by multiple values on the board.

BRIEF DESCRIPTION OF THE DRAWINGS

The above and other objects, features and advantages of the invention will become apparent from the following detailed description of the invention when read in conjunction with the accompanying drawings wherein:

FIGS. 1A and 1B compose a game board with a 15 by 15 matrix thereon;

FIG. 3 is a perspective view of one International Code Flag tile.

DETAILED DESCRIPTION OF THE INVENTION

Figure 1A:
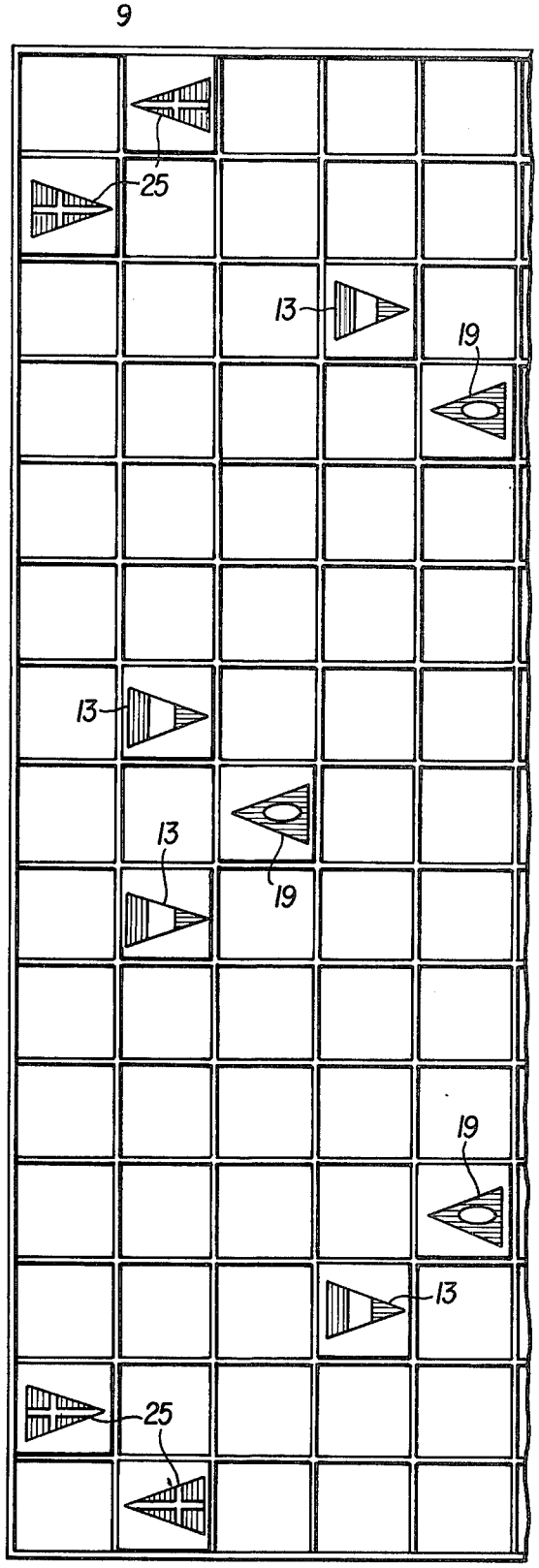

The International Code Flag (ICF) game uses square tiles 1 (see FIG. 3) upon whose flat surfaces are found, on the one side 3, an internationally understood ICF design 5. On the reverse side of each is imprinted a Roman letter equivalent 7. A player maneuvers his tiles on a board 9 (FIGS. 1A and 1B) to form words of ICF designs. These are played with the flag design (surface 3) face-up and their alignment, as in crossword construction, is always across or in a downwardly direction only on the board 9 or on any flat surface. The tiles may freely intermingle and touch as they form new words of ICF designs, or extend or change others already played. The placement of the tiles may be such that one alignment interlocks as it parallels another, or intersects as one group crosses another, or abuts another at right angles, or extends another from either end. Whatever form the action takes, it must always make word sense.

The ICF game also uses a new and highly simplified method for tallying scores. Rather than the prior art wherein the tiles or game board squares have printed the number values, to determine the face value of a given ICF symbol, one needs simply to count the number of colors that are basic to the design. Each symbol will vary from a single color only to as many as four colors that are basic to the design. For example, the symbol for the letter "N" has sixteen small checkered squares which make up the whole design, but basic to the composition are the smaller parts of eight blue squares alternating with eight white squares—or just two basic colors; therefore, the face value for this symbol is just "2 points". Next, see the ICF design representing the letter "Y". Its total composition is comprised of ten diagonally alternating red and yellow stripes; but, since only those two colors are basic to its design, it, too, is assigned a face value of "2 points". One final example, the ICF designs for the letters "C", "T", and "W". All use just the three colors of red and white and blue. The first of these has five alternating horizontal stripes, the second has three vertical stripes, and the last is comprised of three rectangles, with one enclosed by the other. Because of the number of colors basic to their respective designs, each is given a "3 point" value.

The only exception to the foregoing general rule concerns the ICF for the letter "Q", the whole composition of which is the single color yellow. But, because it is one of the two lowest frequency letters and often difficult to play, it is arbitrarily assigned a face value of "4 points".

Figure 2:
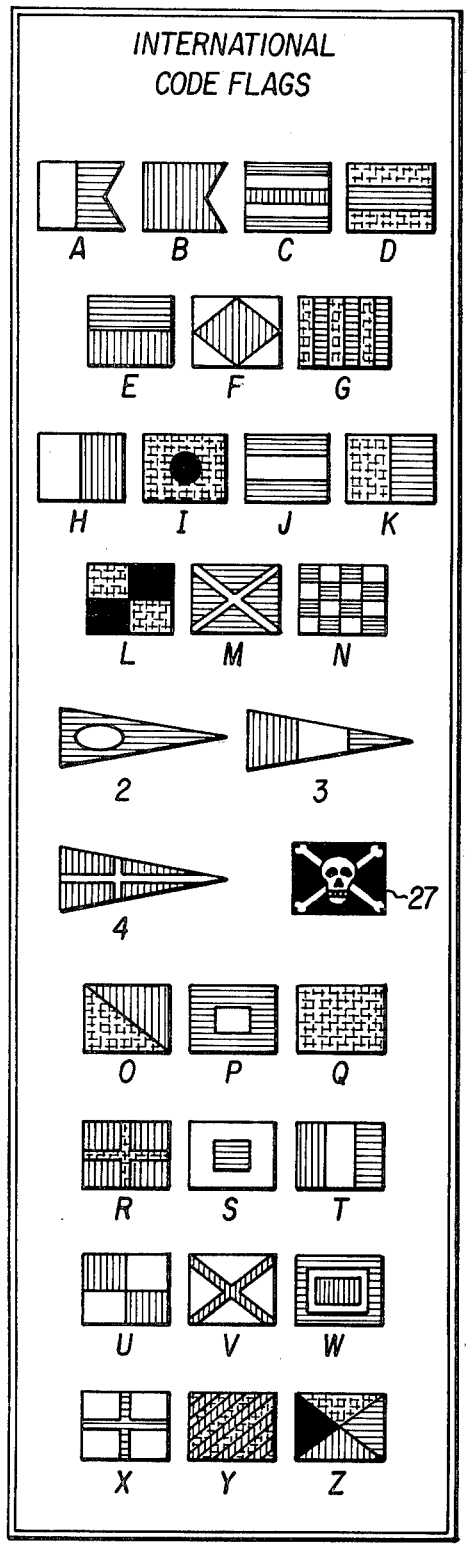
FIG. 2 illustrates the International Code Flags with their accompanying letters.

Two kinds of symbols designate the bonus squares for ICF Crosswords. One uses the standard maritime design for buoy markers 11, and the other comprises ICF pennant designs 13, the latter representing certain Arabic numbers illustrated in FIG. 2. All are equidistantly dispersed from the center 15 which is a special premium square. The buoy markers 11 used here are of the tapered shape design and are therefore sometimes called "nuns".

The design of the mid-channel buoy marker (MCBM) 17 uses black and white vertical stripes and is unnumbered. The game's first player must position his tiles so that one will occupy this marker. Because it is solely regulated by the face value of the letter symbol placed on it, its bonus awards vary so that it functions in a totally different way from all the other dividend squares. Because of the kind of variation associated with this square, it is possible for a player to double or triple or, infrequently, quadruple his letter and word scores with only the slightest shift of the letter elements used. Thus, the possible higher or lower score for a given play is also dependent upon the degree of skill applied by the player. In the instance of the starting play, and in besting his fellow players, he must take into account, too, the direction of play—across or down—and the values and proximity of nearby premium squares.

The black and red numbered buoys 11 have solid colors and are dispersed around the mid-channel buoy marker (MCBM) 17 around which is focused the start of the game. The black buoys 11 are numbered 3, 5, 7, and 9 (number 1 has been left out since it could not function as an intended bonus factor). The red buoys are numbered 2, 4, 6, and 8. Thus, a tile occupying one of these squares allows a player to multiply the face value of that tile by the number found on the buoy.

The ICF number pennants 13 are the remaining dividend squares and act as both a letter-and-a-word premium factor. These are also distributed equidistantly from the center on all sides and to the board's corners. They are not specifically numbered as in the case of the earlier described buoy markers but, according to design, do represent the Arabic numbers 2, 3, and 4. Those with the blue background 19 upon which is superimposed a small white oval or circle represent the number 2; the tripartitioned pennants 23 of red and white and blue stand for the number 3; and those with the red background quartered by a white cross 25 designate the number 4. Restated, their intended use is to double or triple or quadruple the letter-word scores when occupied by a tile. Accordingly, a player will multiply the face value of the concerned tile by the number that pennant marker represents. A bonus tile 27 in the form of a "Jolly Roger" is also included.

Before the start of the game, each player draws a tile from a container. The one drawing the letter "E" first will start the game. In the unlikely event of a tie, only those concerned will continue to draw until only one has the required tile. All tiles are then returned to the container. The rules of play are found in the copyrighted Appendix attached hereto. P While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

I claim:

1. An educational game apparatus for teaching International Code Flags comprising:
   (a) a plurality of tiles, each tile having an International Code Flag insignia on a surface thereof, said plurality of tiles containing substantially all letters of the alphabet and wherein each tile has a predetermined score value determined by the number of different colors thereon;
   (b) a game board having means for dividing the board into a plurality of areas on which the tiles are placed to form words,
   (c) said game board includes areas having supplemental values in the form of both International Code Flag number pennants and numbered nautical buoys thereon;
   (d) wherein the tiles are played by one or more persons to form words.

2. An educational game as defined in claim 1 including a bonus tile including a pirate ensign thereon for use as a substitute for a letter or as a means of precluding another person from extending a word.

3. An educational game apparatus as defined in claim 3 wherein a Roman letter equivalent is placed on a second surface of the respective tile.

* * * * *